United States Patent
Tsai

[19]

[11] Patent Number: 6,018,401
[45] Date of Patent: Jan. 25, 2000

[54] CARRIAGE WITH A STRETCHED FUNCTION ADAPTED TO BE USED IN AN IMAGE SCANNING APPARATUS

[75] Inventor: Jenn-Tsair Tsai, Hsinchu, Taiwan

[73] Assignee: Mustek Systems Inc., Taiwan

[21] Appl. No.: 09/055,289

[22] Filed: Apr. 6, 1998

[30] Foreign Application Priority Data

Sep. 26, 1997 [TW] Taiwan ................................ 86216444

[51] Int. Cl.[7] ........................................................... H04N 1/04
[52] U.S. Cl. ............................ 358/475; 358/494; 358/497; 358/474
[58] Field of Search ........................................... 358/475, 474, 358/494, 497, 487, 506; 382/312, 315

[56] References Cited

U.S. PATENT DOCUMENTS

| | | | |
|---|---|---|---|
| 5,161,029 | 11/1992 | Yamanishi | 358/497 |
| 5,251,039 | 10/1993 | Kusumoto et al. | 358/497 |
| 5,289,000 | 2/1994 | Toyofuku | 358/497 |
| 5,453,850 | 9/1995 | Akuzawa et al. | 358/475 |
| 5,717,503 | 2/1998 | Chien | 358/475 |
| 5,760,924 | 6/1998 | Takahara et al. | 358/475 |
| 5,913,091 | 6/1999 | Nanba et al. | 358/497 |

*Primary Examiner*—Joseph Mancuso
*Assistant Examiner*—Hien Truong
*Attorney, Agent, or Firm*—Shoemaker and Mattare, Ltd.

[57] ABSTRACT

A carriage with a stretched function is provided for being used in an image scanning apparatus. The carriage includes a first part, having a first contact surface and a second contact surface and movable between a start position and an end position of a scanning area of the image scanning apparatus, for disposing thereon the light source and initial reflector of the image scanning apparatus, and a second part having a third contact surface and a fourth contact surface for disposing thereon a reflector set of the image scanning apparatus, wherein the second contact surface is separated from the fourth contact surface by a distance and the first contact surface will contact the third contact surface when the first part is positioned on the start position, and the second contact surface will contact the fourth contact surface and the first contact surface is separated from the third contact surface by the distance when the first part is positioned on the end position.

14 Claims, 5 Drawing Sheets

CARRIAGE WITH A STRETCHED FUNCTION ADAPTED TO BE USED IN AN IMAGE SCANNING APPARATUS

FIELD OF THE INVENTION

The present invention is related to a carriage, and especially to a carriage with a stretched function adapted to be used in an image scanning apparatus.

BACKGROUND OF THE INVENTION

As we know, there is a tendency toward small and/or slim things in the electronic world, but they are still expected to preserve the original functions or have the improved effectiveness. Referring to FIG. 1a, a carriage 110 of the conventional flatbed scanner 101 is integrally formed. A document 111 provides an optical signal after receiving a light generated from the light source 102. The optical signal is transmitted to a lens 107 through four reflectors (103, 104, 105, and 106) and is received by a charge coupled device (CCD) 108 to complete a scanning process. FIG. 1b is a top view of the conventional carriage. The conventional carriage belongs to a fixed type carriage which additionally occupies a space (having a span distance 112) when a scanning window 115 disposed on the carriage 110 is positioned on the start position 113 of the scanning area of the scanner 101. However, the space does not make any contribution to the scanning process, Therefore, the applicant attempts to decrease the space of the scanner by eliminating the unnecessary distance 112, but a document with the same length can be still scanned.

SUMMARY OF THE INVENTION

An object of the present invention is to provide a carriage adapted to be used in an image scanning apparatus for decreasing the space of the image scanning apparatus.

According to the present invention, the carriage includes a first part having a first contact surface and a second contact surface and movable between a start position and an end position of a scanning area of the image scanning apparatus for disposing thereon a light source and an initial reflector of the image scanning apparatus, and a second part having a third contact surface and a fourth contact surface, wherein the second contact surface is separated from the fourth contact surface by a distance and the first contact surface will contact the third contact surface when the first part is positioned on the start position, and the second contact surface will contact the fourth contact surface and the first contact surface is separated from the third contact surface by the distance when the first part is positioned on the end position.

In accordance with one aspect of the present invention, the image scanning apparatus further includes a lens unit and an image sensing device, both of which are disposed on the first part of the carriage.

In accordance with another aspect of the present invention, the image scanning apparatus further includes a reflector set disposed on the second part of the carriage.

In accordance with another aspect of the present invention, an object is put on the scanning area and provides an optical signal after receiving a light generated from the light source.

In accordance with another aspect of the present invention, an optical distance of the optical signal transmitted from the object to the lens unit through the reflector set is an object distance and an optical distance of the optical signal transmitted from the lens unit to the image sensing device is an image distance.

In accordance with another aspect of the present invention, a placement between the lens unit and the image sensing device is fixed such that the image distance is fixed.

In accordance with another aspect of the present invention, an increase in the object distance occurred when the first contact surface is away from the third contact surface will be compensated by a decrease in the object distance as the second contact surface is correspondingly close to the fourth contact surface such that the object distance is fixed to decrease a space of the image scanning apparatus.

In accordance with another aspect of the present invention, the image sensing device is a charge coupled device (CCD).

In accordance with another aspect of the present invention, the first part is an active carrige and the second part is a following carriage.

In accordance with another aspect of the present invention, the second part is driven by the first part to the end position after the first part is moved. by the distance from the start position. Similarly, the second part can also be driven by the first part to the start position after the first part is moved by the distance from the end position.

In another preferred embodiment of the present invention, the object distance is an optical distance of the optical signal transmitted from the object to the lens unit through a part of the reflector set and the image distance is an optical distance of the optical signal transmitted from the lens unit to the image sensing device through the other part of the reflector set. An increase in the object distance occurred when the first contact surface is away from the third contact surface will be compensated by a decrease in the object distance as the second contact surface is correspondingly close to the fourth contact surface, and simultaneously an increase in the image distance occurred when the first contact surface is away from the third contact surface will be compensated by a decrease in the image distance as the second contact surface is correspondingly close to the fourth contact surface such that the object distance and the image distance are fixed to decrease a space of the image scanning apparatus.

The present invention may best be understood through the following description with reference to the accompanying drawings, in which:

DETAILED DESCRIPTION OF THE PREFERRED EMBODIMENT

Figure 1A:
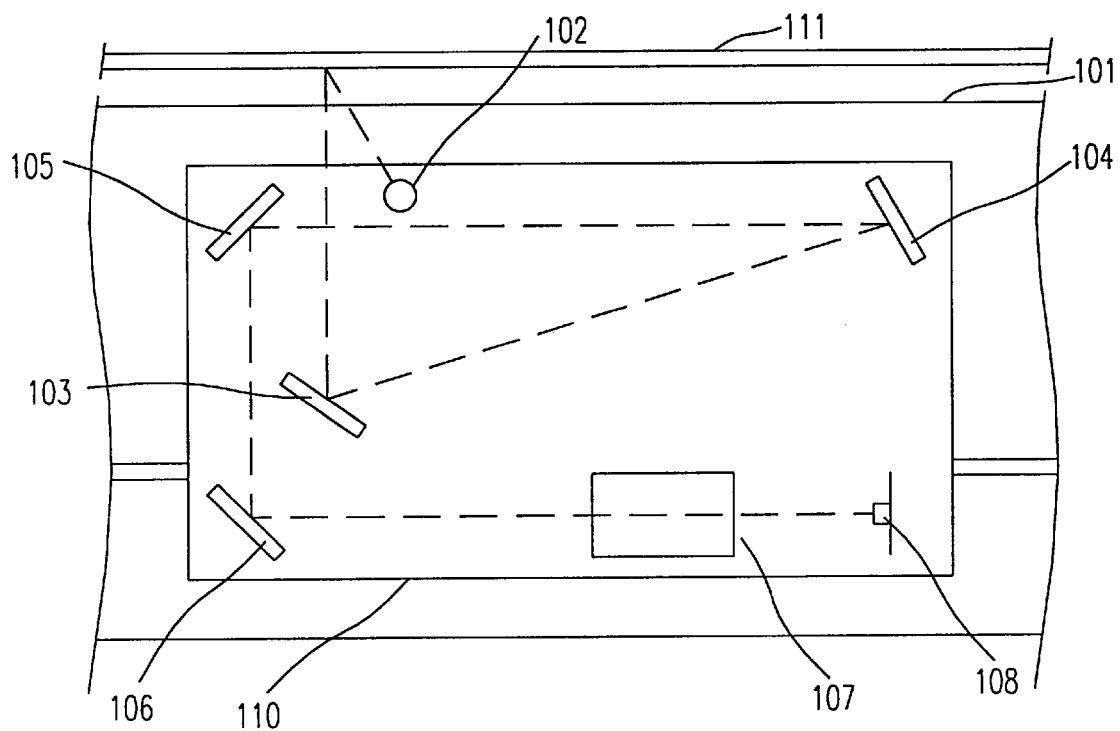
FIG. 1a is a sectional view showing a conventional carriage.
Figure 1B:
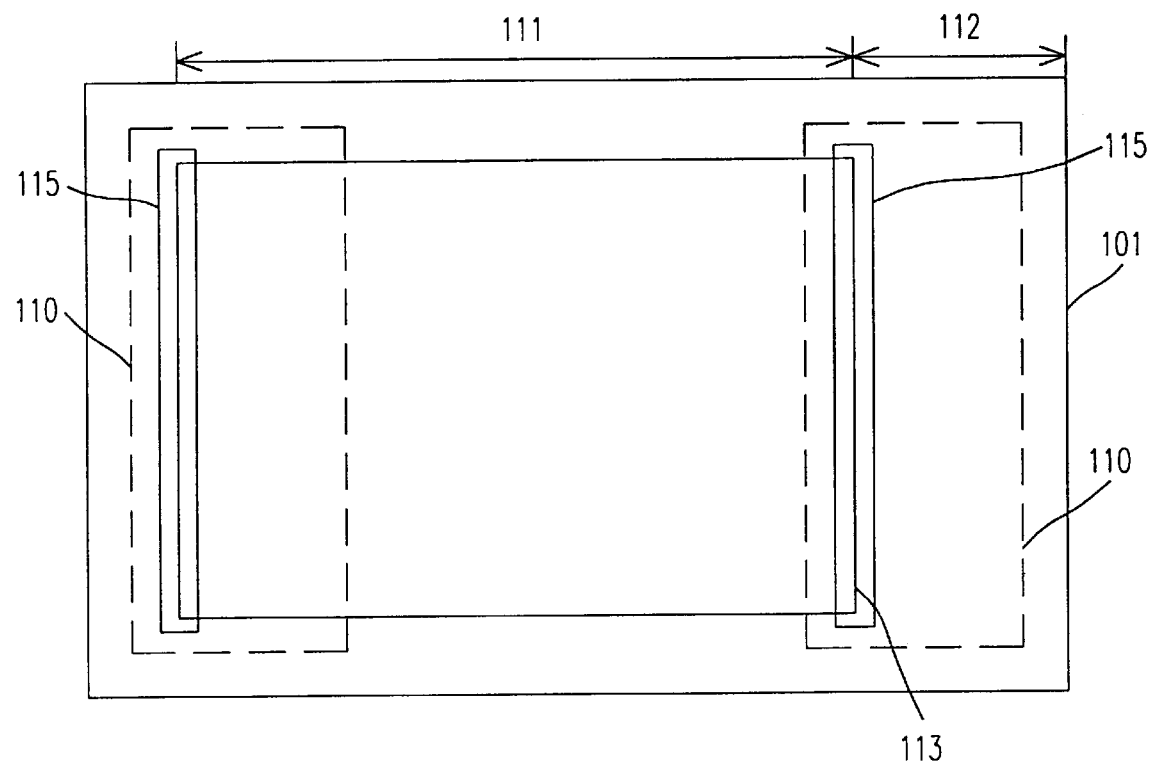
FIG. 1b is a top view showin g the conventional carriage.
Figure 2:
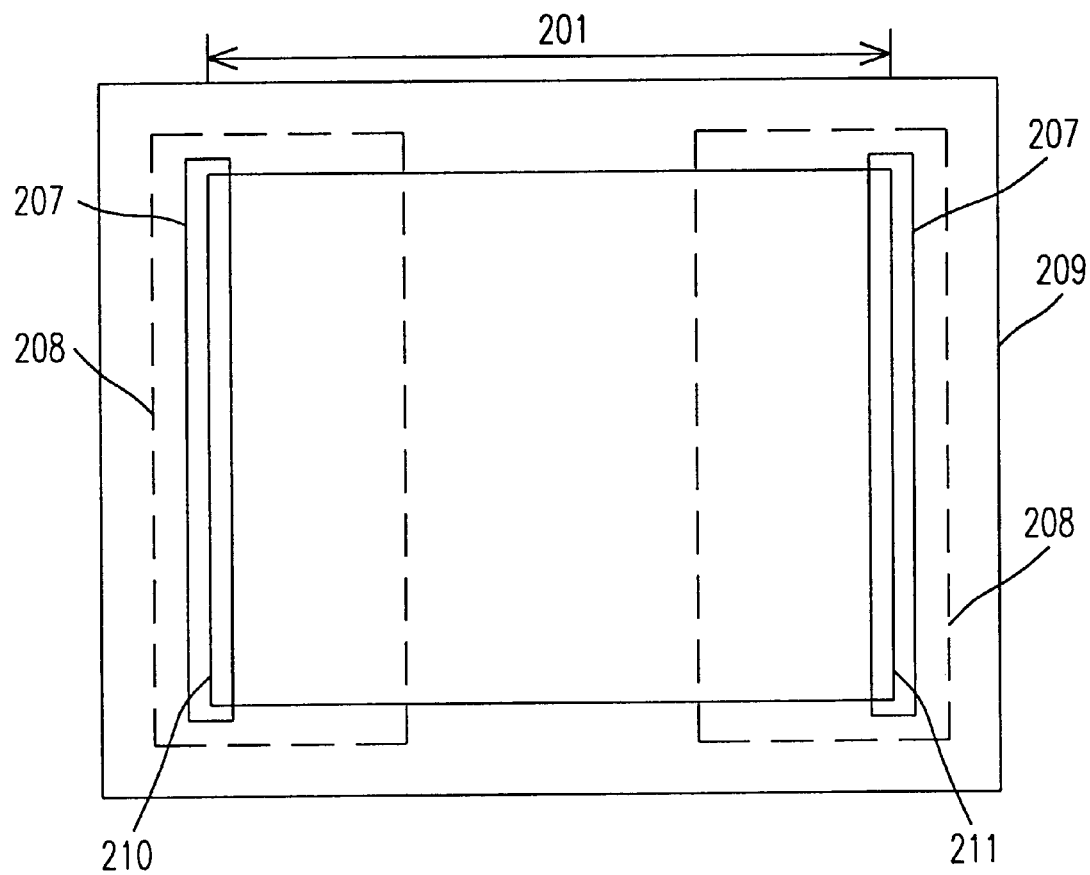
FIG. 2 is a top view showing a p referred embodiment of a carriage according to the present invention.

FIG. 2 is a top view of a carriage of a preferred embodiment of the present invention. The carriage at least includes two parts for shifting the scanning window 207. After a document with a length 201 is put on the scanning area, the carriage 208 is moved from the start position 211 to the end position 210 for scanning the document. When the scanning window 207 is positioned on the start position 211 of the scanning area of the image scanning apparatus 209 (e.g. a flatbed scanner), the carriage 208 will not additionally occupy a space like the situation of the conventional carriage 110 shown in FIG. 1*b*. Thus, the space of the image scanning apparatus 209 can be greatly decreased.

Figure 3:
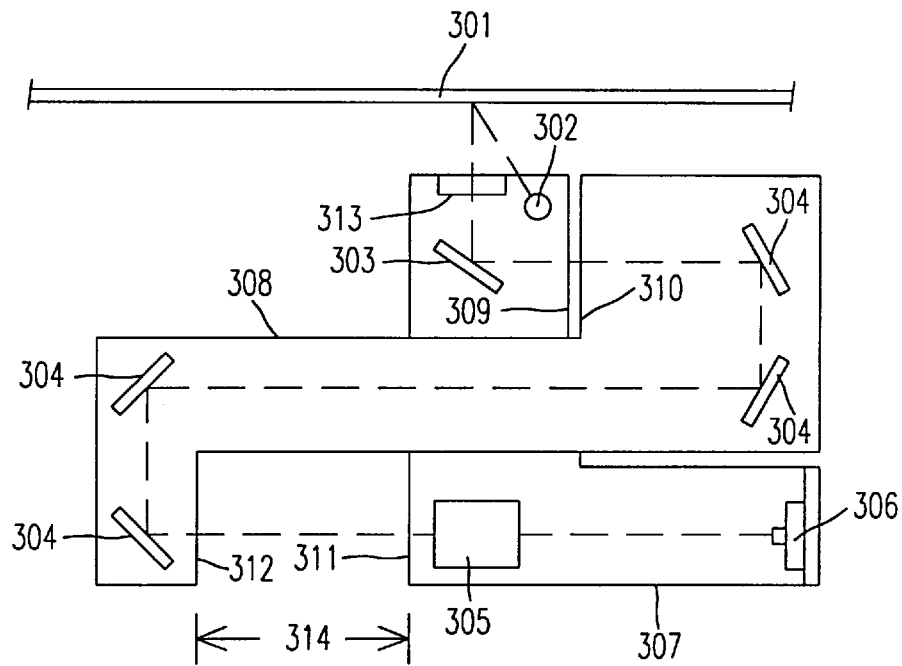
FIG. 3 is a sectional view showing the first preferred embodiment of a carriage according to the present invention.

The carriage shown in FIG. 3 is the first preferred embodiment of the present invention. The carriage includes a first part 307 and a second part 308. The appearance of the first part 307 and the second part 308 can be like that shown in FIG. 3. The image scanning apparatus includes a light source 302, an initial reflector 303, a lens unit 305, and an image sensing device 306, all of which are disposed on the first part 307 of the carriage. The image scanning apparatus further includes a reflector set 304 disposed on the second part 308 of the carriage.

Please refer to FIG. 2 and FIG. 3. The first part 307 has a first contact surface 309 and a second contact surface 311 and is movable between a start position 211 and an end position 210 of a scanning area of the image scanning apparatus. The second part 308 has a third contact surface 310 and a fourth contact surface 312. When the scanning window 313 disposed on the first part 307 is positioned on the start position 211, the second contact surface 311 is separated from the fourth contact surface 312 by a distance 314 and the first contact surface 309 will contact the third contact surface 310. On the contrary, the second contact surface 311 will contact the fourth contact surface 312 and the first contact surface 309 is separated from the third contact surface 310 by the distance 314 when the scanning window 313 is positioned on the end position 210.

When an object or a document 301 is put on the scanning area to be scanned, it provides an optical signal after receiving a light generated from the light source 302. The optical distance of the optical signal transmitted from the document 301 to the lens unit 305 through the scanning window 313, the initial reflector 303, and the reflector set 304 is defined as an object distance. The optical distance of the optical signal transmitted from the lens unit 305 to the image sensing device 306 is an image distance. The image sensing device 306 can be a charge coupled device (CCD). The first part 307 is an active carriage which can be driven by a driving belt and the second part 308 is a following carriage. The second part 308 is driven by the first part 307 to the end position 210 after the first part 307 is moved by the distance 314 from the start position 211. On the contrary, the second part 308 can be driven by the first part 307 to the start position 211 after the first part 307 is moved by the distance 314 from the end position 210.

The distance between the lens unit 305 and the image sensing device 306 is fixed such that the image distance is fixed. On the other hand, during the movement process as described above, an increase in the object distance occurred when the first contact surface 309 is away from the third contact surface 310 will be compensated by a decrease in the object distance as the second contact surface 311 is correspondingly close to the fourth contact surface 312. Similarly, a decrease in the object distance occurred when the first contact surface 309 is close to the third contact surface 310 will be compensated by an increase in the object distance as the second contact surface 311 is correspondingly away from the fourth contact surface 312. Thus, the object distance is fixed so that the space of the image scanning apparatus can be greatly decreased.

Figure 4:
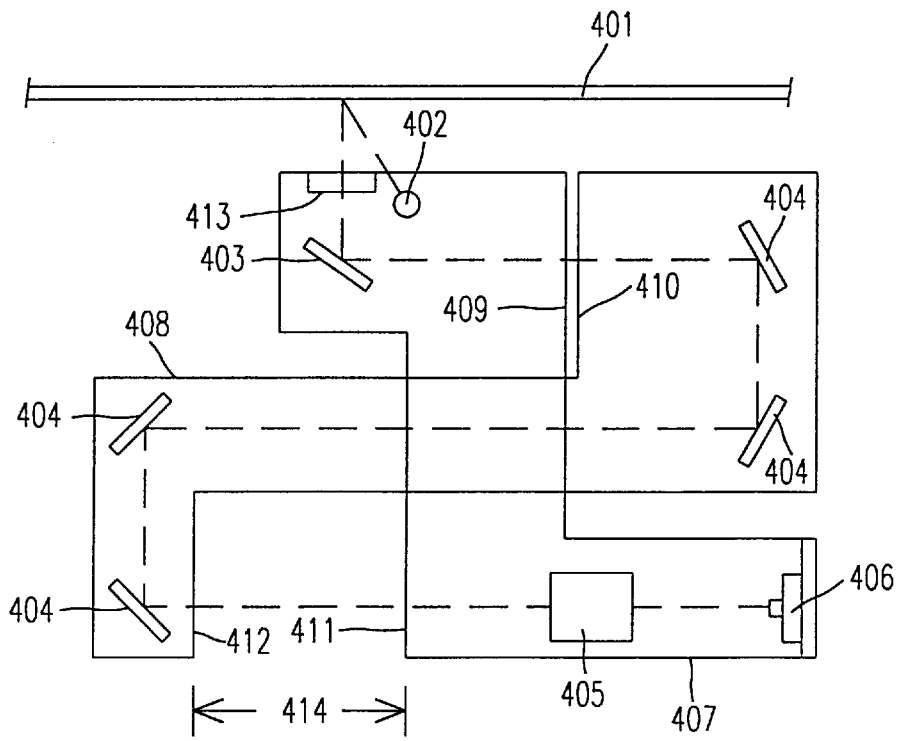
FIG. 4 is a sectional view showing the second preferred embodiment of a carriage according to the present invention.
Figure 5:
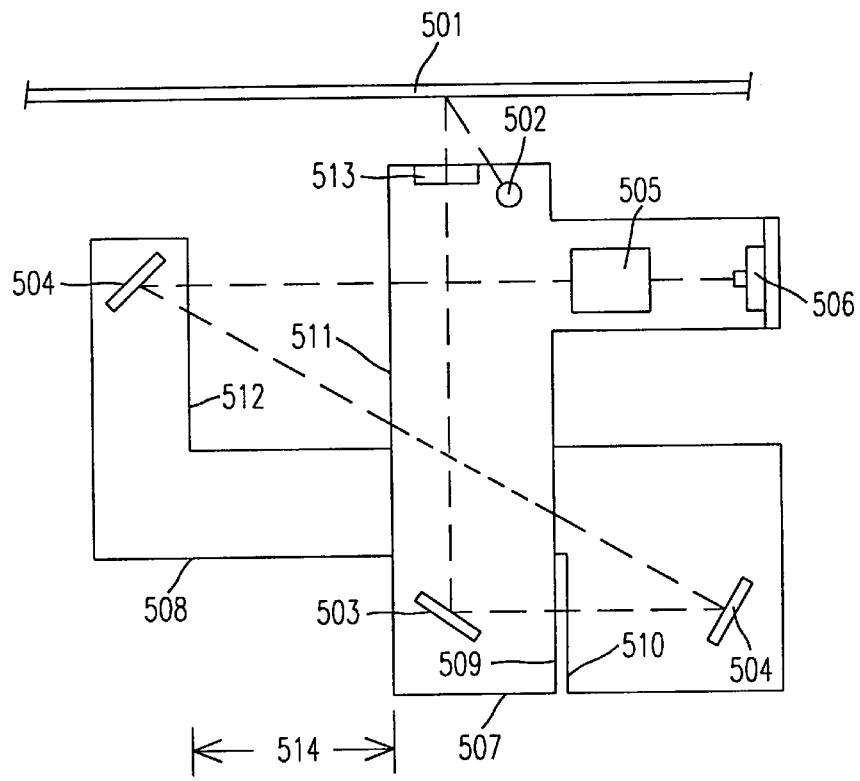
FIG. 5 is a sectional view showing the third preferred embodiment of a carriage according to the present invention.

The symbols shown in FIG. 4 and FIG. 5 are described as follows:

401, 501: a document
402, 502: a light source
403, 503: an initial reflector
404, 504: a reflector set
405, 505: a lens unit
406, 506: an image induction apparatus
407, 507: the first part
408, 508: the second part
409, 509: a first contact surface
410, 510: a third contact surface
411, 511: a second contact surface
412, 512: a fourth contact surface
413, 513: a scanning window
414, 514: adistance The first part 407 and the second part 408 have shapes like that shown in FIG. 4. The appearances of the first part 507 and the second part 508 look like that shown in FIG. 5. The principles of FIG. 4 and FIG. 5 are the same as that of FIG. 3.

Figure 6:
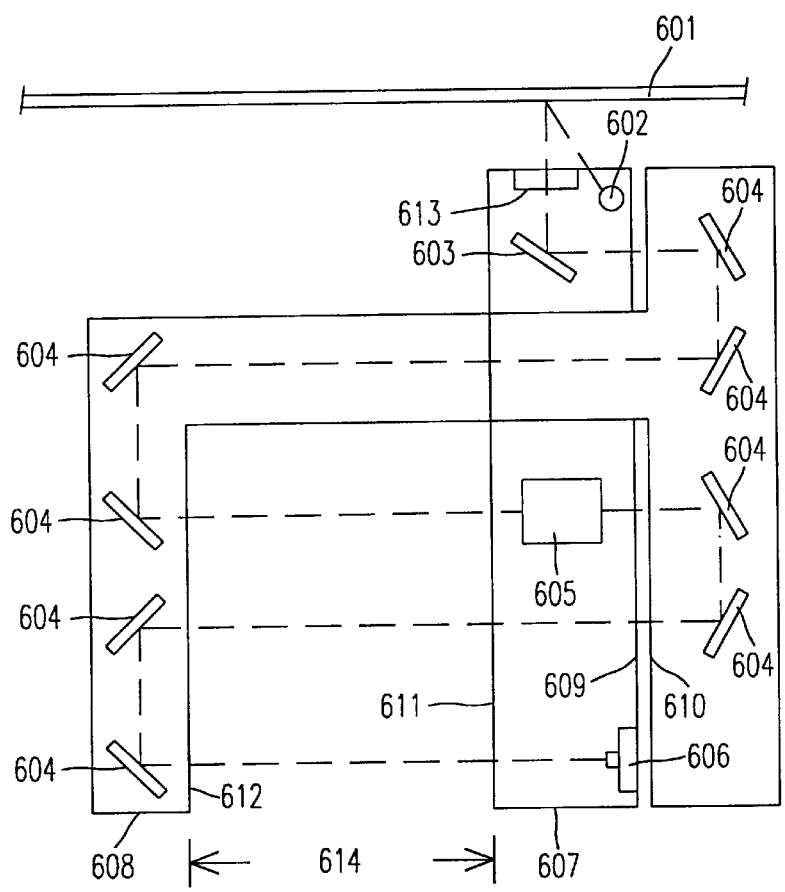
FIG. 6 is a sectional view showing the fourth preferred embodiment of a carriage according to the present invention.

In another preferred embodiment of the carriage of the present invention, the appearances of the first part 607 and the second part 608 look like that as shown in FIG. 6. The image scanning apparatus includes a light source 602, an initial reflector 603, a lens unit 605, and an image sensing device 606, all of which are disposed on the first part 607 of the carriage. The image scanning apparatus further includes a reflector set 604 disposed on the second part 608 of the carriage. The first part 607 has a first contact surface 609 and a second contact surface 611 and is movable between a start position and an end position of a scanning area of the image scanning apparatus. The second part 608 has a third contact surface 610 and a fourth contact surface 612. The second contact surface 611 is separated from the fourth contact surface 612 by a distance 614 and the first contact surface 609 will contact the third contact surface 610 when the scanning window 613 disposed on the first part 607 is positioned on the start position. Similarly, the second contact surface 611 will contact the fourth contact surface 612 and the first contact surface 609 is separated from the third contact surface 610 by the distance 614 when the scanning window 613 is positioned on the end position.

When a document 601 is put on the scanning area to be scanned, it provides an optical signal after receiving a light generated from the light source 602. The optical distance of the optical signal transmitted from the document 601 to the lens unit 305 through the scanning window 613, the initial reflector 603, and partial reflector set 604 is defined as an object distance and the optical distance of the optical signal transmitted from the lens unit 605 to the image sensing device 606 through partial reflector set 604 is an image distance. The second part 608 is driven by the first part 607 to the end position 610 after the first part 607 is moved by the distance 614 from the start position. Likewise, the second part 608 can also be driven by the first part 607 to the start position 609 after the first part 607 is moved by the distance 614 from the end position.

During the movement as descibed above, an increase in the object distance occurred when the first contact surface 609 is away from the third contact surface 610 will be compensated by a decrease in the object distance as the second contact surface 611 is correspondingly close to the fourth contact surface 612, and simultaneously an increase in the image distance occurred when the first contact surface 609 is away from the third contact surface 610 will be compensated by a decrease in the image distance as the second contact surface 611 is correspondingly close to the fourth contact surface 612. On the contrary, a decrease in the object distance occurred when the first contact surface 609 is close to the third contact surface 610 will be compensated by an increase in the object distance as the second contact surface 611 is correspondingly away from the fourth contact surface 612, and simultaneously a decrease in the image distance occurred when the first contact surface 609 is close to the third contact surface 610 will be compensated by an increase in the image distance as the second contact surface 611 is correspondingly away from the fourth contact surface 612. Therefore, the object distance and the image distance are constant so that the space of the image scanning apparatus can be decreased in some degree.

The present invention provides a carriage with a stretched function which can effectively decrease the space of the scanner but can be still used to scan a document with the same length in comparison with the conventional carriage.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A carriage adapted to be used in an image scanning apparatus having a light source, an initial reflector, a reflector set, a lens unit, and an image sensing device for providing a fixed object distance and a fixed image distance, comprising:

a first part movable between a start position and an end position of a scanning area of said image scanning apparatus and having a first contact surface and a second contact surface for disposing thereon said light source and said initial reflector; and a second part having a third contact surface and a fourth contact surface, wherein said second contact surface is separated from said fourth contact surface by a distance and said first contact surface will contact said third contact surface when said first part is positioned on said start position, and said second contact surface will contact said fourth contact surface and said first contact surface is separated from said third contact surface by said distance when said first part is positioned on said end position.

2. A carriage according to claim 1 wherein said lens unit and said image sensing device are disposed on said first part.

3. A carriage according to claim 1 wherein said reflector set is disposed on said second part.

4. A carriage according to claim 1 wherein an object is put on said scanning area and provides an optical signal after receiving a light generated from said light source.

5. A carriage according to claim 4 wherein said object distance is an optical distance of said optical signal transmitted from said object to said lens unit through said reflector set and said image distance is an optical distance of said optical signal transmitted from said lens unit to said image sensing device.

6. A carriage according to claim 5 wherein a placement between said lens unit and said image sensing device is fixed such that said image distance is fixed.

7. A carriage according to claim 6 wherein an increase in said object distance occurred when said first contact surface is away from said third contact surface will be compensated by a decrease in said object distance as said second contact surface is correspondingly close to said fourth contact surface such that said object distance is fixed to decrease a space of said image scanning apparatus.

8. A carriage according to claim 4 wherein said object distance is an optical distance of said optical signal transmitted from said object to said lens unit through a part of said reflector set and said image distance is an optical distance of said optical signal transmitted from said lens unit to said image sensing device through the other part of said reflector set.

9. A carriage according to claim 8 wherein an increase in said object distance occurred when said first contact surface is away from said third contact surface will be compensated by a decrease in said object distance as said second contact surface is correspondingly close to said fourth contact surface.

10. A carriage according to claim 9 wherein an increase in said image distance occurred when said first contact surface is away from said third contact surface will be compensated by a decrease in said image distance as said second contact surface is correspondingly close to said fourth contact surface such that said object distance and said image distance are fixed to decrease a space of said image scanning apparatus.

11. A carriage according to claim 10 wherein said second part is driven by said first part to said end position after said first part is moved by said distance from said start position.

12. A carriage according to claim 1 wherein said image sensing device is a charge coupled device (CCD).

13. A carriage according to claim 12 wherein said second part is driven by the first part to said start position after said first part is moved by said distance from said end position.

14. A carriage according to claim 1 wherein said first part is an active carrige and the second part is a following carriage.

* * * * *